April 12, 1949.  E. L. CRANDELL  2,466,931

RADIO FREQUENCY APPARATUS

Filed May 14, 1946

INVENTOR.
Ervin L. Crandell
BY Robert J. Palmer
Attorney

Patented Apr. 12, 1949

2,466,931

UNITED STATES PATENT OFFICE 2,466,931

RADIO-FREQUENCY APPARATUS

Ervin L. Crandell, Boston, Mass., assignor, by mesne assignments, to Stevens-Arnold Inc., Boston, Mass., a corporation of Massachusetts Application May 14, 1946, Serial No. 669,552

4 Claims. (Cl. 250—40)

1

This invention relates to radio frequency apparatus, and relates more particularly to automatic tuning controls for such apparatus.

In radio frequency apparatus such, for example, as a thermionic oscillator providing a high frequency, electrostatic field between electrodes used for heating articles through dielectric hysteresis, changes in the dielectric loss, changes in electric capacity, and other changes may cause the load circuit to be thrown off resonance.

This invention provides a frequency wobbler for varying the frequency to which a load circuit is tuned, and supplies the alternating current component caused by the frequency wobbler to a rectifier and then to controls for returning the load circuit to resonance when load changes cause the detuning thereof.

An object of the invention is to utilize energy from a radio frequency load circuit for maintaining the circuit tuned to resonance.

The invention will now be described with reference to the drawing, of which:

Figure 1:
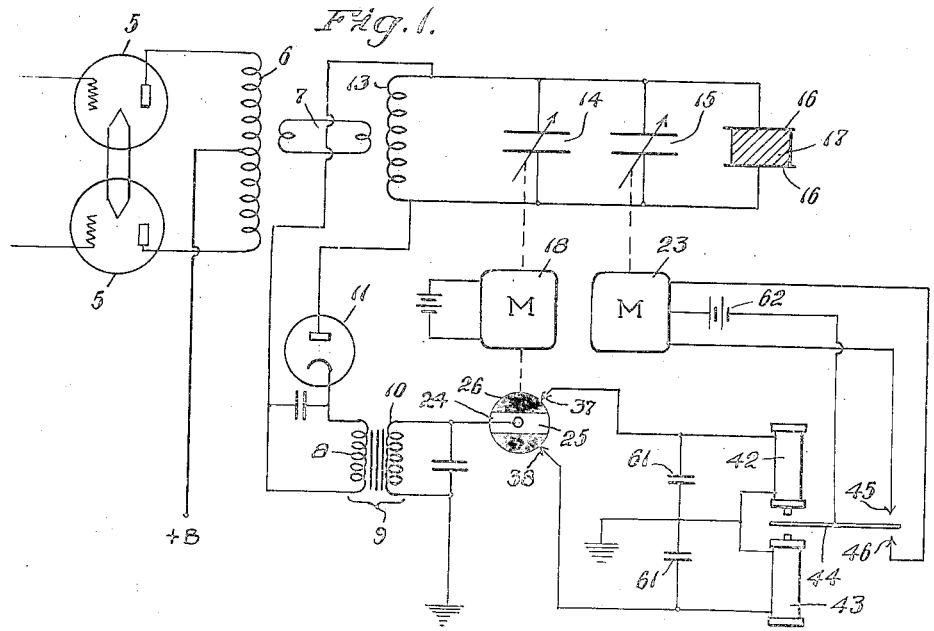
Fig. 1 is a circuit schematic illustrating one embodiment of the invention.

The push-pull connected radio frequency amplifier tubes 5 are adapted to have their inputs connected to the output of a conventional oscillator, and are coupled through the plate coil 6 and link coupling 7 to the load circuit coil 13. The coil 13 is tuned by the shunt condensers 14 and 15, and has the shunt electrodes 16 with an article 17 to be heated, therebetween. The rotor of the condenser 14 is rotated continuously by the motor 18 as in a conventional frequency wobbler circuit. The reversible motor 23 rotates the rotor of the condenser 15 for retuning the load circuit to resonance as same is detuned therefrom by load changes.

The center of the plate coil 6 is connected to +B as is usual in push-pull amplifier circuits.

The primary winding 8 of the transformer 9 is connected in series with the cathode and anode of the rectifier tube 11, to the ends of the load circuit coil 13. The secondary winding 10 of the transformer is connected to the commutator 25 and to ground. The commutator has the rectifying segment 24 which contacts in sequence, the contacts 37 and 38, and is rotated by the motor 18 which rotates the frequency wobbler condenser 14.

The contact 37 is connected to one end of the

2 energizing winding of the relay 42, and the contact 38 is connected to one end of the energizing winding of the relay 43. The other ends of the relay windings are connected together and to ground. The storage condensers 61 are connected to the contacts 37 and 38 and to ground.

The armature 44 of the relays has the contacts 45 and 46 on the opposite sides thereof, and is connected to one side of the battery 62, the other side of which is connected to the reversible motor 23. The field winding of the motor is so connected to its armature and to the contacts 45 and 46 that when the relay armature 44 strikes the contact 46, the battery 62 is connected to rotate the motor in one direction, and when the armature 44 strikes the contact 45, the battery is reversely applied to the motor field causing reverse rotation.

Figure 2:
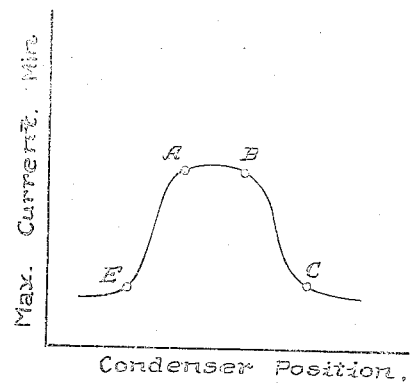
Fig. 2 is a chart illustrating a resonance curve resulting from the operation of the tuning controls of Fig. 1.

The motor 18 as it rotates the commutator 25, alternately applies through the contacts 37 and 38, the rectified current from the secondary of the transformer to the relays 42 and 43. The condensers 61 maintain the relays energized when not energized from the commutator. The current rectified by the commutator is the alternating current component caused by the rotation of the condenser. The commutator rectifies this current since rotated synchronously with its source. The rectified current supplied to one relay will be stronger than that supplied to the other relay if the load circuit is not tuned to resonance. The reason for this may be understood with reference to Fig. 2 which is a resonance curve with the capacities of the condenser 14 during one complete rotation of its rotor as ordinates, and the values of the rectified currents as abcissae.

When the load circuit is tuned to its resonance frequency, the variations in the capacity of the condenser 14 will result in the rectified currents having values between the points A and B on the resonance curve. This will result in both relays receiving the same current during the rotation of the commutator 25, and their armature 44 will remain in its neutral position and the motor 23 will not operate.

If the load circuit is above resonance, the rectified currents will vary between the points B and C on the curve. This will result in the relay 42 becoming more strongly energized causing the relay armature to strike the contact 46 and thereby cause the motor 23 to start rotating in one direction to adjust the condenser 15 to retune the load circuit to resonance.

When the load circuit is tuned below resonance, the rectified current from the commutator will vary between the points A and E on the resonance curve. This will result in the relay 43 becoming more strongly energized, and the armature 44 to strike the contact 45 causing the motor 23 to start rotation in the other direction to adjust the condenser 15 to retune the load circuit to resonance.

Advantages of obtaining the control current from the load circuit as compared to taking it from the space current circuits of the oscillator or radio frequency amplifier tubes as has been proposed, is that all of the control apparatus can be located at the load station without the necessity for running wires back to the power source. This is especially important where it is desired to couple several load circuits to one source of radio frequency energy.

While one embodiment of the invention has been described for the purpose of illustration, it should be understood that the invention is not limited to the exact circuit and circuit components illustrated, since modifications thereof may be suggested by those skilled in the art without departure from the essence of the invention.

What is claimed is:

1. Radio frequency apparatus comprising a source of radio frequency energy, a load circuit coupled to said source, continuously operated means for alternately increasing and decreasing the frequency to which said circuit is tuned, a rectifier, a transformer, means connecting the primary winding of said transformer and said rectifier in series to opposite sides of said circuit, means for tuning said load circuit to resonance independently of said continuously operated means, and means utilizing current from the secondary winding of said transformer for actuating said load circuit tuning means.

2. Radio frequency apparatus according to claim 1 in which the current utilizing means includes a synchronous rectifier driven with said continuously operated means.

3. Radio frequency apparatus comprising a source of radio frequency energy, a load circuit coupled to said source, continuously operated means for alternately increasing and decreasing the frequency to which said circuit is tuned, a rectifier, a transformer, means connecting said rectifier and the primary winding of said transformer in series to opposite sides of said circuit, tuning means for tuning said load circuit to resonance independently of said continuously operated means, a reversible motor for adjusting said tuning means, and means utilizing current from the secondary winding of said transformer for causing said motor to operate in one direction when said load circuit is tuned above resonance and to operate in the opposite direction when said circuit is tuned below resonance.

4. Radio frequency apparatus according to claim 3 in which the current utilizing means includes a synchronous rectifier driven with said continuously operated means.

ERVIN L. CRANDELL.

REFERENCES CITED

The following references are of record in the file of this patent:

UNITED STATES PATENTS

| Number | Name | Date |
|---|---|---|
| 2,032,117 | Corbett | Feb. 25, 1936 |
| 2,376,667 | Cunningham et al. | May 22, 1945 |
| 2,415,799 | Reifel | Feb. 11, 1947 |